United States Patent [19]
Reid et al.

[11] Patent Number: 5,339,242
[45] Date of Patent: Aug. 16, 1994

[54] METHOD AND APPARATUS FOR VEHICLE CRASH DISCRIMINATION BASED ON OSCILLATION AND ENERGY CONTENT

[75] Inventors: John D. Reid, Troy; Jack L. Jensen, Highland, both of Mich.

[73] Assignee: Delco Electronics Corp., Kokomo, Ind.

[21] Appl. No.: 797,850

[22] Filed: Nov. 26, 1991

[51] Int. Cl.$^5$ .............................. B60R 21/32
[52] U.S. Cl. .................. 364/424.05; 180/282; 280/735; 307/10.1; 340/436
[58] Field of Search ............ 364/424.01, 424.05; 307/10.1; 180/271, 282; 280/728, 734, 735; 340/436, 669

[56] References Cited

U.S. PATENT DOCUMENTS

| | | | |
|---|---|---|---|
| 3,762,495 | 10/1973 | Usui et al. | 280/735 X |
| 3,911,391 | 10/1975 | Held et al. | 280/735 X |
| 4,979,763 | 12/1990 | Blackburn | 280/735 |
| 4,985,835 | 1/1991 | Sterler et al. | 364/424.05 |
| 4,994,972 | 2/1991 | Diller | 364/424.05 |
| 5,014,810 | 5/1991 | Mattes et al. | 180/268 |
| 5,021,678 | 6/1991 | Diller | 307/10.1 |
| 5,036,467 | 7/1991 | Blackburn et al. | 364/424.05 |
| 5,037,129 | 8/1991 | Fritz et al. | 280/734 |
| 5,040,118 | 8/1991 | Diller | 364/424.05 |
| 5,067,745 | 11/1991 | Yoshikawa | 280/735 |
| 5,073,860 | 12/1991 | Blackburn et al. | 364/424.05 |
| 5,109,341 | 4/1992 | Blackburn et al. | 364/424.05 |
| 5,182,459 | 1/1993 | Okano et al. | 307/10.1 |
| 5,185,701 | 2/1993 | Blackburn et al. | 364/425 |
| 5,189,311 | 2/1993 | Moriyama et al. | 307/10.1 |
| 5,216,607 | 6/1993 | Diller et al. | 364/424.05 |

Primary Examiner—Thomas G. Black
Assistant Examiner—Collin W. Park
Attorney, Agent, or Firm—A. Frank Duke; Mark A. Navarre

[57] ABSTRACT

This invention provides a method and apparatus for distinguishing events which require air bag deployment from those which do not and in particular for detecting a high speed pole impact early in a crash event in order to optimize the benefit of an air bag in such an event.

14 Claims, 6 Drawing Sheets

METHOD AND APPARATUS FOR VEHICLE CRASH DISCRIMINATION BASED ON OSCILLATION AND ENERGY CONTENT

FIELD OF THE INVENTION

This invention relates to methods and apparatus which sense and process vehicle passenger compartment acceleration data in order to distinguish events which require air bag deployment from those which do not.

In U.S. patent application Ser. No. 07/798,487, filed Nov. 26, 1991, assigned to the assignee of the present invention and incorporated herein by reference, such a system and method is disclosed. According to that application time dependent velocity data representing a boundary between non-deployment and deployment events is continually consulted following the onset of a crash in order to determine whether the air bag should be deployed. The present invention is an improved method and apparatus capable of distinguishing between frontal pole impacts and non-deployment events.

BACKGROUND OF THE INVENTION

Frontal pole impacts present a problem for passenger compartment electronic sensing devices used for determining if an air bag should be deployed or not, and if so, at what time. This is due to the relatively soft initial impact that poles apply to the vehicle which results in a velocity vs. time profile which is similar to that of a 9 MPH frontal barrier impact. In the case of the pole impact, deployment of the air bag is desirable whereas a 9 MPH frontal barrier impact should not cause the air bag to be deployed.

FIG. 1 graphically illustrates the problem. The 30 MPH center high pole impact for the vehicle involved, does not distinguish itself from the 9 MPH frontal barrier impact until 58 msec into the crash which is 15 msec after the optimal time for firing the driver side air bag.

Initially, it will be noted that the velocity curve of the 30 MPH pole is far more "wavy" than the 9 MPH barrier during the early portion of the crash. This means that the acceleration trace of the pole impact had far more oscillation than the 9 MPH barrier. FIG. 2 shows the deceleration of the vehicle during a 30 MPH center high pole crash. The peak in deceleration at 5 msec corresponds to the bumper collapse, and the peak at 25 msec into the crash corresponds to the radiator/tie bar collapse. The final, major deceleration starting at 40 msec corresponds to the pole contacting the engine. The engine quickly contacts the front of the dash and the car stops abruptly. Between the major structural components very little resistance is felt by the pole during the crash, and the pole quickly passes through the car. This lack of resistance during the pole crash is what makes electronic based sensing of the crash difficult. Comparing the velocity traces in FIG. 1 the 30 MPH pole is actually less severe than the 9 MPH frontal barrier during the initial 60 msec of the crash.

FIG. 3 shows that the deceleration of the passenger compartment is closely proportional to the frontal barrier forces. By comparing FIGS. 2 and 3 one can conclude that during the pole impact the vehicle experience pulse type forces (large values for short time periods) while the 9 MPH frontal barrier the vehicle experienced relatively constant type forces. The pulse type forces felt by the passenger compartment during the pole crash are believed to be the cause of the observed higher acceleration oscillation relative to the 9 MPH frontal barrier crash.

SUMMARY OF THE INVENTION

Relative to non-deployment cases, pole impacts exhibit both high energy and large acceleration oscillation content in their signals, while non-deployment impacts do not exhibit both of these and thus can be discriminated. After considerable testing, the non-deployment impacts of interest can be classified by the following table:

| | |
|---|---|
| 9 MPH Frontal Barriers | Small Oscillation |
| 20 MPH Undercarriage Hits | Generally Low Energy |
| 50 MPH Deer Hits | Generally Low Energy |
| Rough Road Tests | 75% Low Energy, 25% Small Oscillations |
| Abuse Tests | Low Energy |

In accordance with the present invention a method of detecting high speed pole impacts using accelerometer based data is provided which utilizes the higher acceleration oscillation and higher energy of pole impacts relative to non-deployment impacts as the two criteria for discrimination.

The formula proposed for calculating the oscillation measurement is:

$$OM = \int |da(t)/dt| \, dt \quad (1)$$

The reasoning behind this calculation is as follows. The derivative of the acceleration gives the rate of change of the acceleration (referred to as the jerk). The total area under the jerk curve is an indication of how the acceleration is oscillating over time. Total area is the integral of the jerk curve (using absolute value to counter subtracting area when jerk goes negative). If an acceleration contains high oscillation (both frequency and magnitude) then this oscillation measurement becomes very large.

The second criteria for pole detection involves detecting impacts with significant amounts of kinetic energy.

$$\begin{aligned} \text{Energy} &= \int \text{mass } v(t) \, dv \\ &= 1/2 * \text{mass} * v(t)^2 \end{aligned} \quad (2)$$

Since the mass is constant one can equivalently plot $v^2$ vs. time for the energy curves. For simplification purposes one can look at the square root of the energy, which leaves a simple velocity vs. time curve for energy detection.

In accordance with the present invention an air bag deployment command is issued if a crash event exceeds both an energy boundary curve and an oscillation boundary curve to thereby discriminate between high speed pole impacts and from all air bag non-deployment impacts.

BRIEF DESCRIPTION OF THE DRAWINGS

A more complete understanding of the invention may be obtained from the following description taken in conjunction with the accompanying drawings wherein like references refer to like parts and wherein.

DETAILED DESCRIPTION

Figure 1:
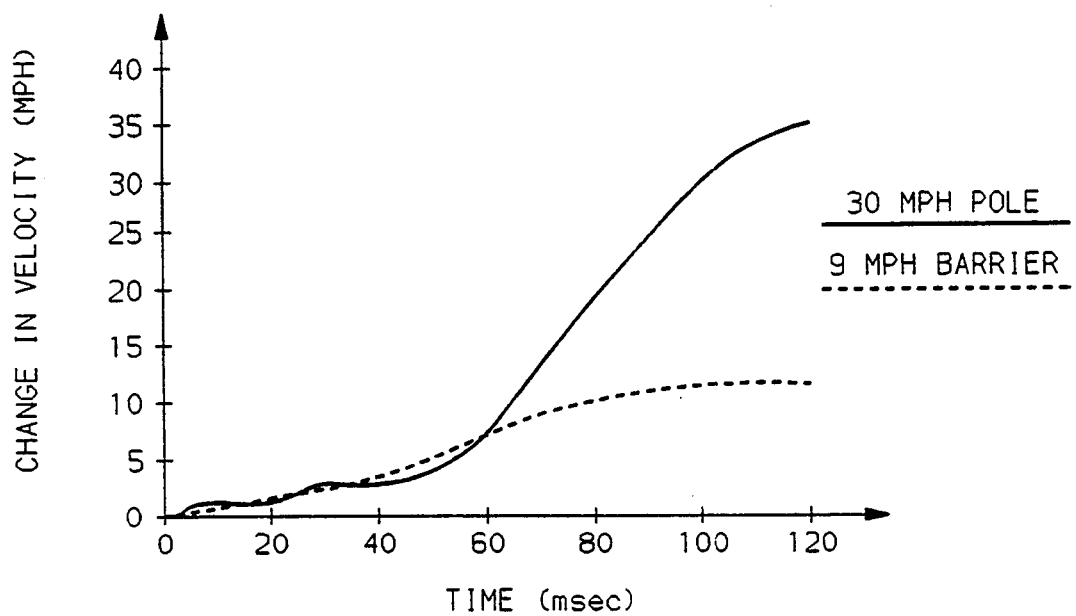
FIG. 1 is a velocity vs. time plot of a 30 MPH pole impact and a 9 MPH Barrier impact.
Figure 2:
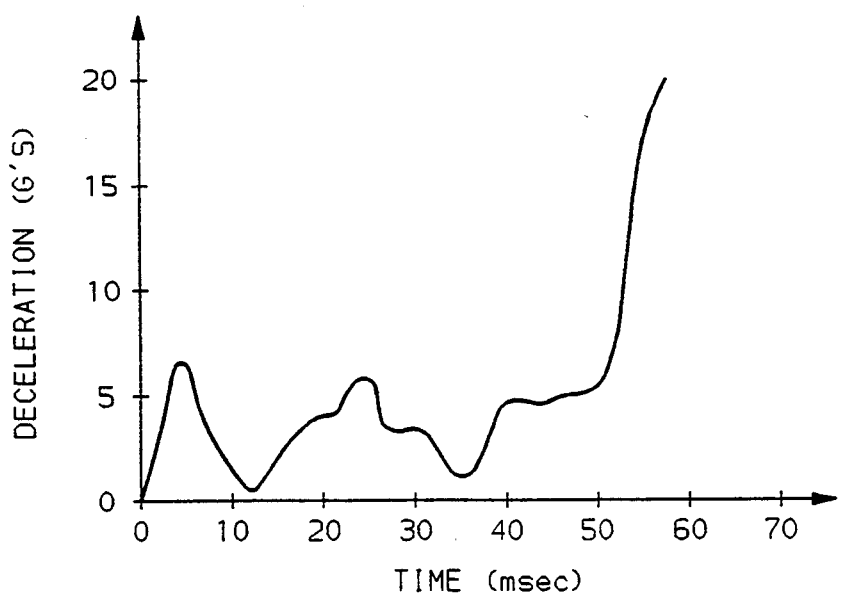
FIG. 2 shows the deceleration of the vehicle during a 30 MPH center high pole crash.
Figure 3:
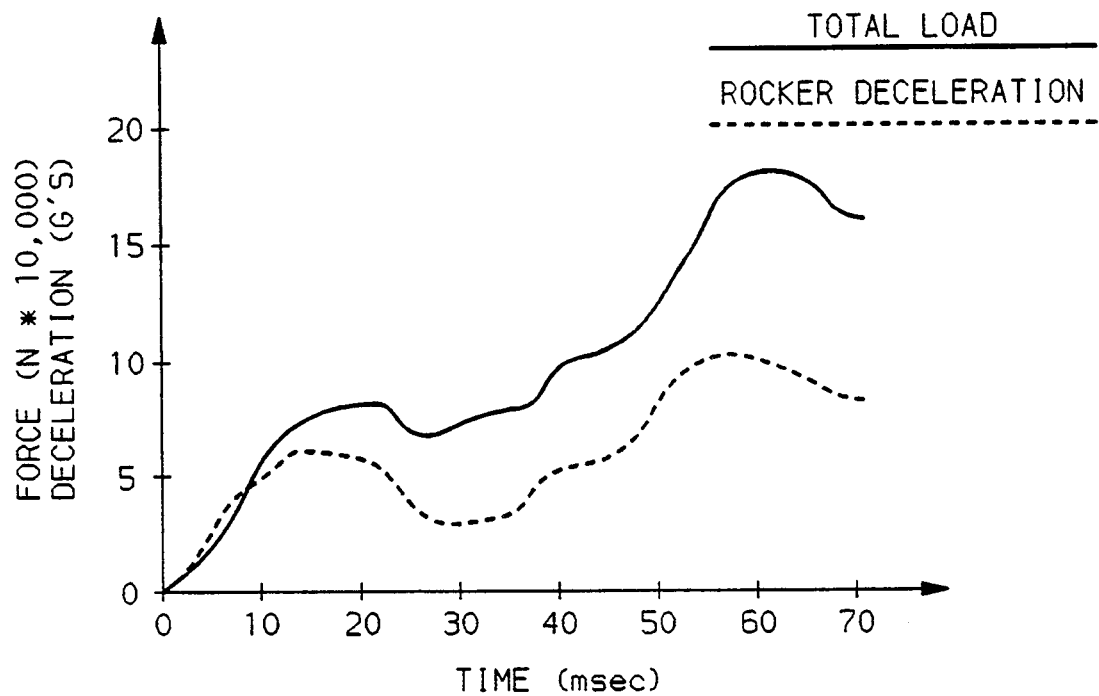
FIG. 3 shows a similarity of the deceleration of the passenger compartment and frontal barrier forces.
Figure 4:
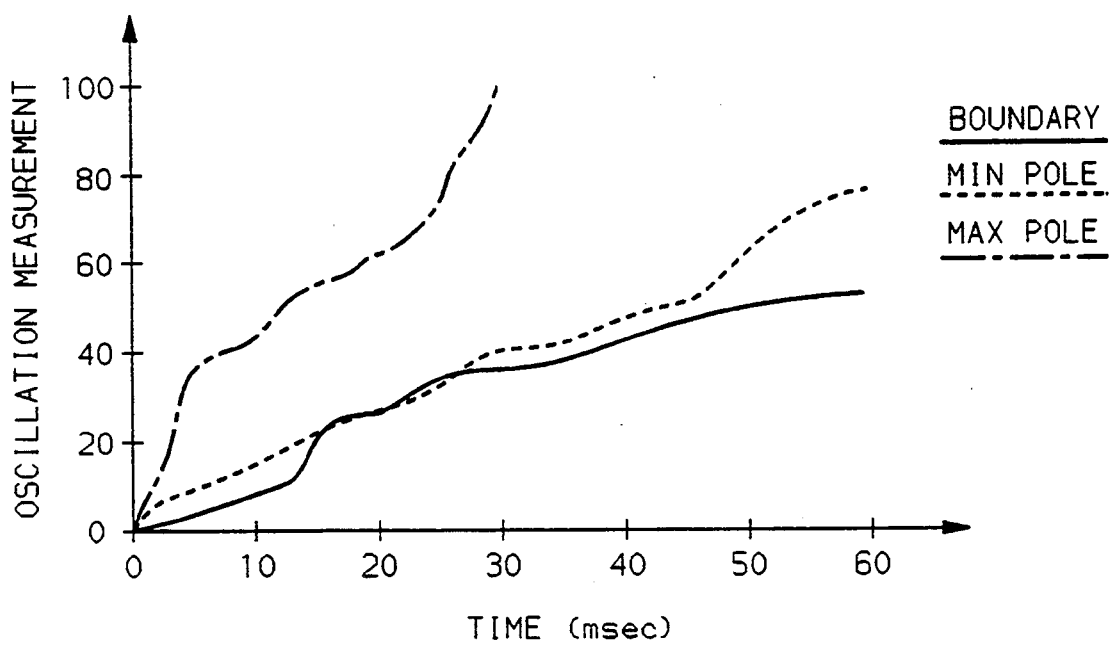
FIGS. 4 and 5 show an oscillation boundary curve and an energy boundary curve for a certain car line as well as minimum and maximum curves for a 30 MPH pole impact test.
Figure 5:
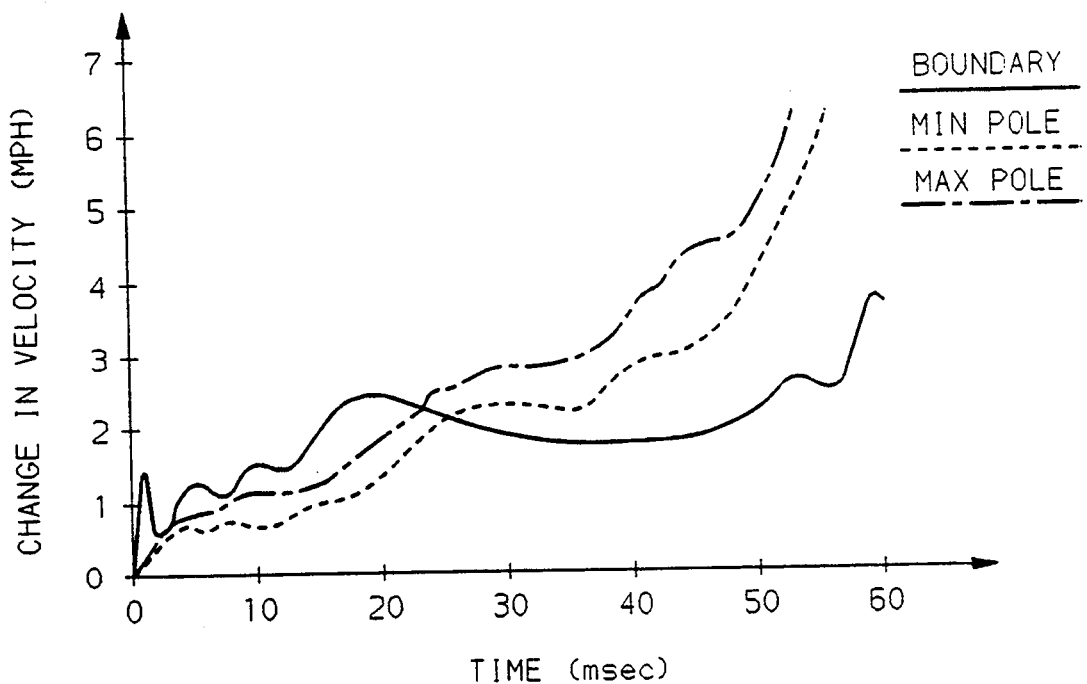

Referring now to FIGS. 4 and 5, an oscillation boundary curve (OBC) and an energy boundary curve (EBC) developed for one car line are respectively shown. The boundary curves shown were created using center tunnel. The max pole and min pole in FIGS. 4 and 5 refer to the maximum and minimum curves created by looking at six locations on the passenger compartment of the 30 MPH pole impact test (i.e., the envelope created by the pole impact from different accelerometer locations). Firing time for an air bag is based on crossing the boundary curves. The recommended firing time for this event is 43 msec. Clearly, the pole event is distinguishable from non-deployment events after 25 MSEC using the OBC and EBC shown.

Figure 6:
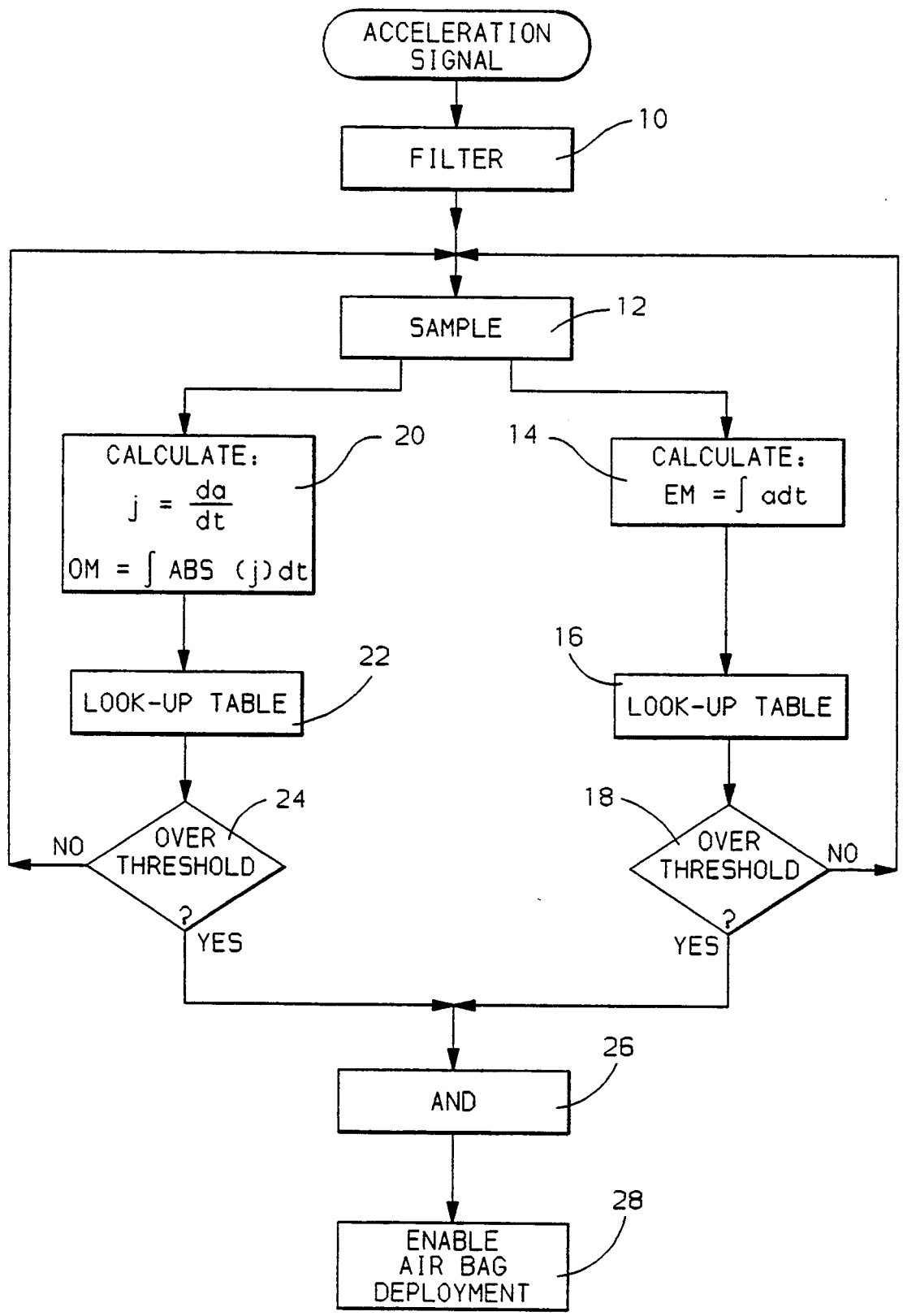
FIG. 6 is a flow chart depicting the overall method of the invention.

The discrimination algorithm of the present invention is illustrated in FIG. 6. As in the aforementioned application, the acceleration signal is filtered at 10 and sampled at 12 and compared with a threshold acceleration. If an acceleration is detected that surpasses a predetermined threshold then is it assumed that the vehicle is undergoing an impact and discrimination calculations begin. The optimal acceleration threshold is between 2 and 5 g's. For the example shown in FIGS. 4 and 5, the threshold was set at 3 g's. A 99 Hz phaseless R-C filter was used and the sampling rate was 1 point per msec.

There are many candidate locations for the accelerometer, including the cowl, the center tunnel and under the front passenger seat. The example of FIGS. 4 and 5 used the center tunnel accelerometers to create boundary curves. Immunity factors are used to provide the algorithm with some robustness to variances that occur from one crash to another, although they may be similar in nature. For the example of FIGS. 4 and 5, immunity scale factors were: (a) 1.1 for 9 MPH frontal barriers, (b) 1.25 for 20 MPH undercarriage and 50 MPH deer hits, (c) 2 for rough road tests, and (d) 10 for abuse tests.

If the acceleration threshold is exceeded indicating an onset of a crash event the acceleration data is integrated at 14 to obtain a change in velocity value from the onset of the crash event indicative of kinetic energy and compared with a value in look up table 16 which represents the velocity vs. time data for the energy boundary curve. If the velocity threshold, for the look up table time entry point following onset of the crash, is exceeded as determined by a COMPARE function 18, the first of the two part deployment criteria is met. The accelerometer data is also used to calculate an oscillation measurement at 20 which is compared with a oscillation threshold value in lookup table 22 for the appropriate time into the crash. If the oscillation threshold value is exceeded as determined by the COMPARE function 24, the second of the two part criteria is met and an air bag enable command is generated. If only one or neither of the thresholds are exceeded then the air bag enable command is not generated.

Preferably the pole detection boundary curves for individual car lines are made as follows:

1. Make oscillation measurement vs. time and velocity vs. time curves for all applicable events consisting of all non-deployment tests and pole tests using the targeted accelerometer location signal. These curves should be made with the desired immunity.

2. Compare each non-deployment test curves from 1. above with the pole curves to determine which one of the two aforementioned pole detection criteria discriminates the pole crash most effectively- The earlier the discrimination the better. The output from this step will be a list of curves that should be used to form the OBC and a list of curves that should be used to form the EBC.

3. Make the OBC composite by forming a curve composed of the maximum oscillation measurements at each time step from all the curves determined, in 2. above, to be significant. Similarly form the EBC using maximum velocities.

4. Check accelerometer location dependency by repeating the above for other passenger compartment acceleration signals. If the OBC and EBC can be made to include multiple, nearby, acceleration signals, without sacrificing performance, then the pole detection scheme for that car line can be made more robust by doing so.

Figure 7:
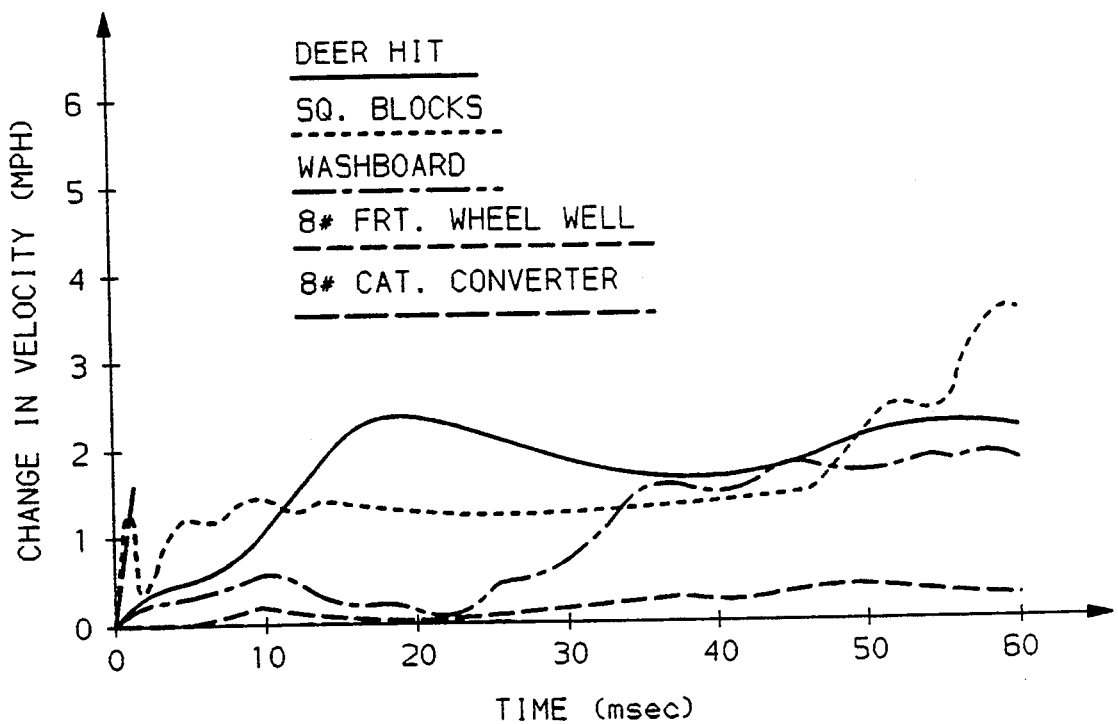
FIG. 7 shows the influential curves used to create the energy boundary curve of FIG. 5.
Figure 8:
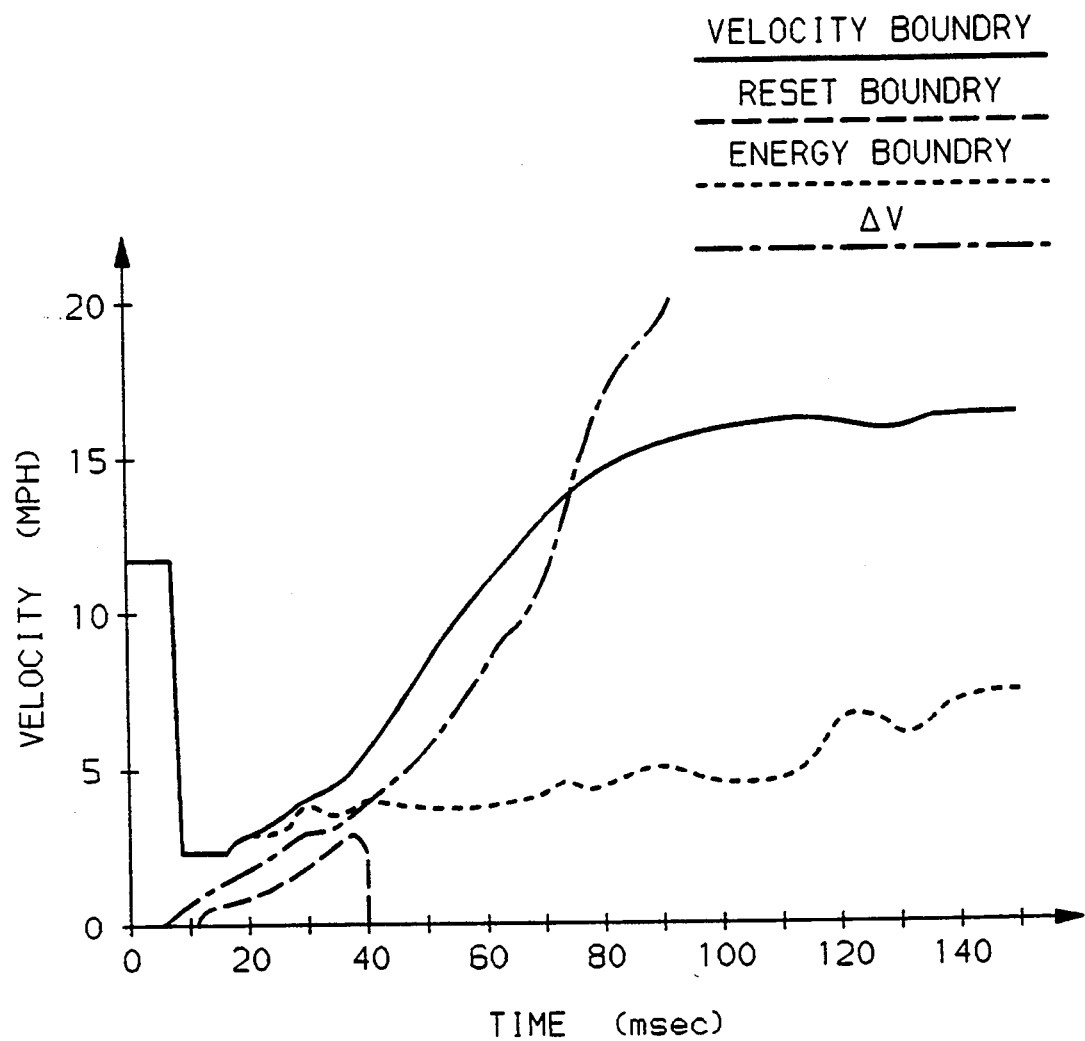
FIG. 8 shows the VBC, EBC and RBC for a certain car line.

FIG. 7 shows the influential curves used to create the EBC composite of FIG. 5. It will be understood that the EBC composite is not the same as the VBC composite of the aforementioned application, since for example the 9 MPH barrier impact data was used in the VBC but not the EBC. This is shown in FIG. 8 where VBC and EBC are shown for one car line.

There are a number of conditions that reset the algorithm to an inactive state. This resetting immediately readies the algorithm for the next possible event if the current event is identified as a non-deployment event or is caused by a fault condition. The Reset Boundary Curve (RBC) shown in FIG. 8 resets the algorithm to ready for a deployment-needed event should it occur just after the rough road event. The RBC is a composite curve formed using the lowest of the velocity measurements over the time interval of interest for each deployment event, including the 9 MPH event, and subtracting a percentage margin. The RBC is a very low velocity boundary which is below any known deployment event. Once the algorithm is enabled, the change in velocity starts out above the RBC and if it ever drops below the RBC an algorithm reset will occur. The RBC improves the performance when multiple events occur almost simultaneously (i.e. curb impact followed by pole impact).

The algorithm is also reset at the end of any event as indicated by a lack of acceleration activity. The inactivity reset covers the period of time the RBC is no longer in effect. Inactivity is indicated and a reset occurs when the filtered absolute value of acceleration drops below a calibratible threshold. Also, the algorithm is reset after some time period if it has not been reset by any other the methods discussed above. This insures that the algorithm will always return to a known state. Once a time-out reset occurs, the acceleration must return to a level below the enable threshold before the algorithm will be allowed to re-enable. Furthermore it is desirable to reset the algorithm when certain accelerometer faults are identified in order to minimize the potential for inadvertent deployments.

Figure 9:
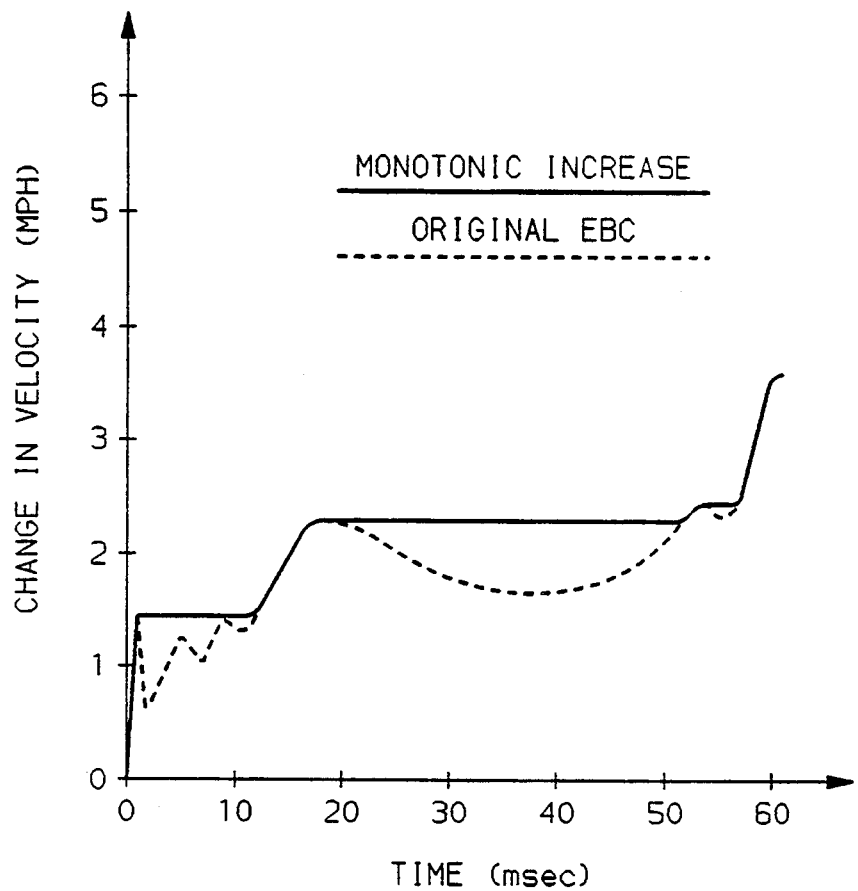
FIGS. 9 and 10 show modification of the curve of FIG. 5.

Three additional boundary curve considerations are as follows:

1. Monotonically Increasing Boundary Curves. Never allow the boundary curves to decrease in time. This applies only to the EBC since the OBC will always be increasing due to its definition. This process helps non-deployment events sensitivity to phase shift (i.e., if a future non-deployment signal is delayed by some time period, its peak will still be under the boundary curve). This concept is shown in FIG. 9.

Figure 10:
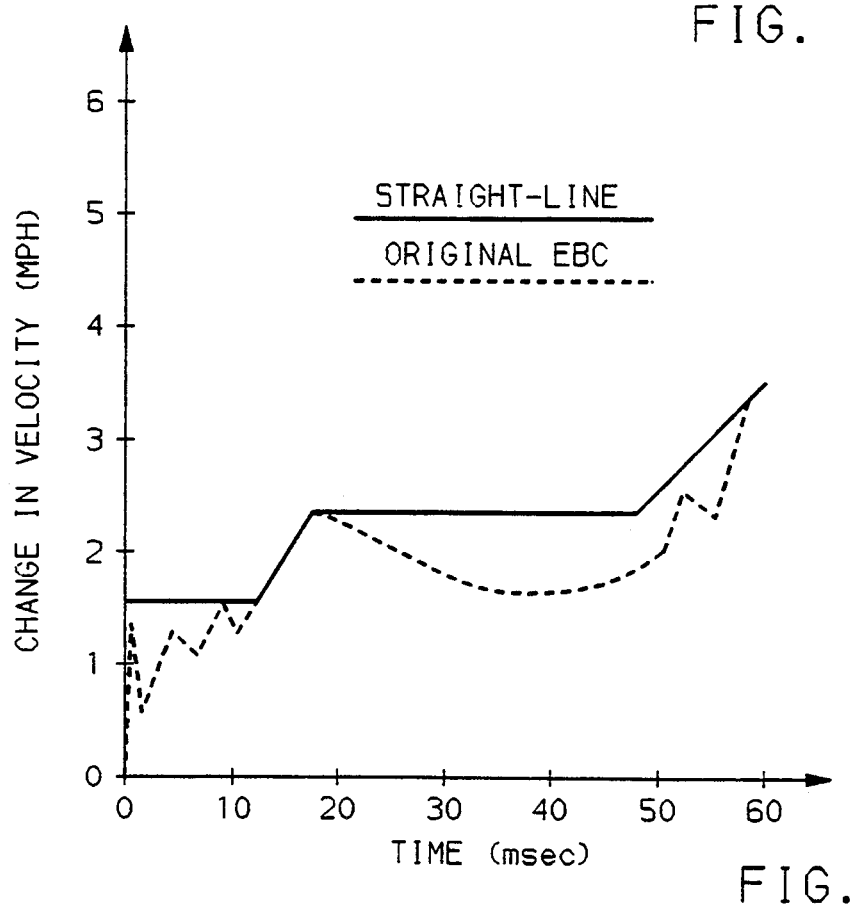

2. Straight Line Approximation. If reasonable piece-wise linear approximations of the OBC and EBC can be determined then considerable time and space are saved in the hardware implementation of the algorithm. FIG. 10 demonstrates this in the example car line.

3. 5 msec Time Delay. Due to the uncertainty of the initial few msec of a crash event, it may be desirable to have extremely high boundaries during the first 5 msec of the OBC and EBC.

The embodiments of the invention in which an exclusive property of privilege is claimed are defined as follows:

1. A method of controlling deployment of an inflatable restraint system for a motor vehicle comprising the steps of:
obtaining vehicle acceleration data, detecting an onset of a crash event at periodic intervals of time after said onset of the crash event, computing a change in vehicle velocity from said acceleration data, selecting a time dependent velocity boundary value from a boundary curve in a velocity vs. time domain which bounds velocity vs. time test data of a plurality of non-deployment events, and comparing said change in vehicle velocity with said velocity boundary value,
at periodic intervals of time after said onset of the crash event, computing an oscillation value corresponding to an oscillation content of the acceleration data, selecting a time dependent oscillation boundary value from a boundary curve in an oscillation vs. time domain which bounds oscillation vs. time test data of at least one non-deployment event, and comparing said oscillation value with said oscillation boundary value, and
deploying the restraint system when said change in vehicle velocity exceeds said velocity boundary value and said oscillation value exceeds said oscillation boundary value.

2. A method of controlling deployment of an inflatable restraint system for a motor vehicle comprising the steps of:
sensing vehicle deceleration and comparing the vehicle deceleration sensed with a deceleration threshold to detect an onset of a crash event,
integrating the sensed vehicle deceleration over a first time interval T1 following detection of the onset of the crash event to determine a change in velocity value and comparing said change in velocity value with a velocity threshold value,
integrating the absolute value of a derivative of vehicle deceleration over a second time interval T2 equal to and immediately adjacent said first time interval T1 to determine an oscillation value, and comparing said oscillation value with an oscillation threshold value,
deploying the restraint system when both said velocity and said oscillation threshold values are respectively exceeded by the change in velocity and oscillation values.

3. A method of controlling deployment of an inflatable restraint system for a motor vehicle comprising the steps of:
sensing vehicle deceleration and comparing the vehicle deceleration sensed with a deceleration threshold to detect an onset of a crash event,
integrating the sensed vehicle deceleration following detection of the onset of the crash event to determine a change in velocity value and comparing said change in velocity value with a velocity threshold value,
integrating the absolute value of a derivative of vehicle deceleration following detection of the onset of the crash event to determine an oscillation value and comparing said oscillation value with an oscillation threshold value,
deploying the restraint system when both said velocity and said oscillation threshold values are exceeded.

4. The method defined in claim 3 wherein said velocity and oscillation threshold values are variable over a predetermined time from the onset of said crash event.

5. The method of claim 4 wherein the velocity threshold values form a velocity boundary curve which is a composite of a plurality of non-deployment events, and wherein the oscillation threshold values form an oscillation boundary curve which is a composite of a plurality of non-deployment events.

6. The method of claim 5 wherein said velocity boundary curve increases monotonically.

7. The method of claim 5 wherein said boundary curves are piece-wise linear approximations of the composite curves.

8. The method of claim 4 wherein the velocity threshold values form a velocity boundary curve which is a composite of peak velocity values at a plurality of points in time for each of a plurality of non-deployment events, and wherein the oscillation threshold values form an oscillation boundary curve which is a composite of peak oscillation values at said plurality of points in time for each of said plurality of non-deployment events.

9. The method of claim 3 including the step of issuing a reset command if the change in vehicle velocity drops below a time varying reset velocity threshold value.

10. The method of claim 3 including the step of issuing a reset command if said change in velocity value drops below a minimum velocity boundary value on a time dependent reset boundary curve formed of minimum velocity changes occurring in test data at predetermined times in each of a plurality of deployment crash events.

11. A method of controlling deployment of an inflatable restraint system for a motor vehicle comprising the steps of:
sampling vehicle deceleration at a predetermined sampling rate to obtain discrete values of deceleration,
comparing vehicle deceleration values with a deceleration threshold to detect a start of a crash event,
summing a predetermined number of vehicle deceleration values following detection of the start of the crash event to determine a change in velocity value, comparing said change in velocity value with a velocity threshold value, summing the absolute value of a difference between successive deceleration samples following detection of the start of the crash event to obtain an oscillation value, comparing said oscillation value with an oscillation threshold value, deploying the restraint system when the change in velocity value exceeds said velocity threshold value AND said oscillation value exceeds said oscillation threshold value.

12. A method of controlling deployment of an inflatable restraint system for a motor vehicle comprising the steps of:

sampling vehicle acceleration at a predetermined sampling rate to obtain discrete values of acceleration, comparing vehicle acceleration values with an acceleration threshold to detect a start of a crash event, summing a predetermined number of vehicle acceleration values following detection of the start of the crash event to determine a change in velocity value, comparing said change in velocity value with a velocity change threshold value obtained from a table of velocity change values corresponding to a composite profile of velocity change vs. time test data of a plurality of non-deployment events for the vehicle, summing the absolute value of a difference between successive acceleration samples following detection of the start of the crash event to obtain an oscillation value, comparing said oscillation value with an oscillation threshold value obtained from a table of oscillation values corresponding to a composite profile of oscillation vs. time test data of a plurality of non-deployment events for the vehicle, deploying the restraint system when the change in vehicle velocity value exceeds said velocity change threshold value AND said oscillation value exceeds said oscillation threshold value obtained from said table.

13. An inflatable restraint system for a motor vehicle comprising:

an inflatable device for protecting an occupant of the vehicle in a crash event, accelerometer means mounted on the vehicle, processor means programmed to monitor data from said accelerometer means to detect an onset of a crash event and to thereafter determine whether the crash event is severe enough to deploy the device, said crash event being determined to be severe enough to deploy the device if a change in vehicle velocity following the onset of the crash event exceeds a time dependent velocity boundary value selected from a velocity vs time profile of a composite of a plurality of non-deployment events and an oscillation measure determined by integrating the absolute value of a derivative of the acceleration data following the onset of the crash event exceeds a time dependent boundary value selected from a profile of at least one non-deployment event.

14. The system of claim 13 wherein the determination of the severity of the crash event is reset if said change in vehicle velocity following the onset of the crash event drops below a minimum velocity boundary value on a time dependent change of velocity profile of a composite of minimum velocity changes in a plurality of test deployment crash events.

* * * * *